United States Patent
Koskelainen et al.

(10) Patent No.: US 6,570,851 B1
(45) Date of Patent: May 27, 2003

(54) RECEIVER DRIVEN DIFFERENTIATED SERVICE MARKING FOR UNICAST AND MULTICAST APPLICATIONS

(75) Inventors: Petri Koskelainen, Tampere (FI); Jarno Rajahalme, Andover, MA (US)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/345,728

(22) Filed: Jul. 1, 1999

(51) Int. Cl.$^7$ ............................................. H04L 12/56
(52) U.S. Cl. ........................ 370/231; 370/235; 370/392; 370/395.21
(58) Field of Search ............................. 370/230.1, 231, 370/235, 236, 278, 282, 388, 395.21, 439, 389, 352, 392

(56) References Cited

U.S. PATENT DOCUMENTS

| | | | | |
|---|---|---|---|---|
| 5,777,984 A | * | 7/1998 | Gun et al. | 370/230 |
| 5,812,527 A | * | 9/1998 | Kline et al. | 370/232 |
| 6,058,113 A | * | 5/2000 | Chang | 370/390 |
| 6,085,252 A | * | 7/2000 | Zhu et al. | 709/231 |
| 6,094,431 A | * | 7/2000 | Yamato et al. | 370/395 |
| 6,154,776 A | * | 11/2000 | Martin | 709/226 |
| 6,167,445 A | * | 12/2000 | Gai et al. | 709/223 |
| 6,208,653 B1 | * | 3/2001 | Ogawa et al. | 370/395 |
| 6,215,769 B1 | * | 4/2001 | Ghani et al. | 370/230 |
| 6,286,052 B1 | * | 9/2001 | McCloghrie et al. | 709/238 |
| 6,353,616 B1 | * | 3/2002 | Elwalid et al. | 370/443 |
| 6,356,553 B1 | * | 3/2002 | Nagami et al. | 370/397 |
| 6,363,053 B1 | * | 3/2002 | Schuster et al. | 370/230 |

FOREIGN PATENT DOCUMENTS

EP 0719012 6/1996 .......... H04L/12/56

OTHER PUBLICATIONS

Marthy, L et al "Improving RSVP for better support of Internet multimedia communications" Multimedia Computing and Systems, pp. 102–106, vol. 2, Jun. 7–11, 1999.*
Mamais, G et al "Efficient buffer management and scheduling in a combined IntServ and DiffServ architecture: a performance study" ATM, pp. 236–242, Jun. 21–23, 1999.*
Stallings, W "Supporting next generation Internet applications today" IT Professional, pp. 29–34, vol. 1, Issue 1, Jan.–Feb. 1999.*
Metz, C. "RSVP: general–purpose signaling for IP" IEEE Internet Computing. vol. 3 Issue 3, May–Jun. 1999, pp. 95–99, 1999.*
S. Blake et al: "RFC 2475—An Architecture for Differentiated Services", IETF Request for Comments, Dec. 1, 1998, XP002139608 (pp. 1–22).

* cited by examiner

*Primary Examiner*—Hassan Kizou
*Assistant Examiner*—Anh-Vu H Ly
(74) *Attorney, Agent, or Firm*—Antonelli, Terry, Stout & Kraus, LLP

(57) ABSTRACT

The present invention is a system (100, 200, 300) and a method of data transmission in a communication system comprising a source node (12) which originates packet data transmissions, a packet data network (18), at least one router or switch (16, 20) and a destination node (14) which receives the packet data transmission.

59 Claims, 5 Drawing Sheets

RECEIVER DRIVEN DIFFERENTIATED SERVICE MARKING FOR UNICAST AND MULTICAST APPLICATIONS

BACKGROUND OF THE INVENTION

1. Field of the Invention

The invention relates to communication systems and methods of communication in which packet data transmissions between source nodes and destination nodes have a controlled per hop processing.

2. Description of the Prior Art

FIG. 1 illustrates a diagram of a prior art communication system 10 for transmitting packet data transmissions between a plurality of source nodes 12 A–N to a plurality of destination nodes 14 1–N. Each destination node 14 may be any type of receiving device, such as a cellular or asynchronous transfer mode (ATM) receiver, etc. Each source node 12, which may be any type of data originating device, originates packet data transmissions each containing data packets which may be transmitted with various data protocols such as, but not limited to, TCP/IP. Individual packet data transmissions from the source nodes 12 are transmitted to one or more routers 16 which are typically under the jurisdiction of an internet service provider (ISP). The data packets are outputted from the routers 16 to a packet data network 18 which typically is an IP network. The packet data network 18 provides connectivity of the inputted data packets received from the routers 16 to one or more routers 20. The routers 20 are also typically under the jurisdiction of an ISP. The last router 20, in a non-wireless embodiment, transmits the packet data transmissions to the destination node 14 via a communication link 22 such as, but not limited to, a relatively low bandwidth telephone link and therefore, a limited data transmission capacity. Alternatively, the last router (n) 20 in a wireless application outputs the packet data transmissions to a base station 24 which transmits the packet data transmission via a wireless link 26, typically of relatively low bandwidth, to the destination node 14. All of the component parts of the communication system 10 are well known and in wide spread usage today.

Traditionally, ISPs have provided all customers with the same level of performance (best-effort service). Service differentiation has been limited to the pricing structure (individual vs. business rates) or the connectivity type (dial-up access vs. leased line, etc.). However, with the growth of the internet in recent years, a temporal scarcity of network capacity can arise which compromises performance of traditional mission critical applications. Additionally, new applications have emerged which demand improved service quality. As a result, ISPs are finding it necessary to offer customers alternative levels of service. As well as meeting new customer expectations, alternative levels of service allow ISPs to improve revenue through premium pricing and competitive differentiation of service offerings, which in turn can fund the necessary expansion of the network.

The internet engineering task force (IETF) has proposed a differentiated services architecture in which IP packets are labelled with a DS field by a source or other node, such as the source nodes 12 or other nodes in FIG. 1. The IETF differentiated services scheme is described in the February 1999 draft—IETF-Diffserv-Framework-02.TXT which document is incorporated herein by reference in its entirety.

The differentiated services architecture is a one-way network to destination node protocol offering a framework within which ISPs can offer each customer a range of network services which are differentiated on the basis of performance in addition to pricing tiers used in the past. Customers request a specific performance level in a packet by packet basis, by marking a differentiated services (DS) field of each packet with a specific value. The DS field contains a differentiated services code point (DSCP). The DSCP is not a priority and is an abstract number which a controlling node, such as a router, maps to a specific per hop behavior (PHB) which in turn relates to quality of service (QOS) or more generically to the treatment of a packet relative to other packets by the controlling node (router) at the time. The PHB is meaningful in relation to other PHBs in the same class (or group) and to the service policy implemented by the controlling node (router). The DS field structure is 8 bits in length with 6 bits (0–5) being allocated to encoding the DSCP and 2 bits (6–7) encoding the quantity CU which is currently unused. The DSCP value selects the PHB processing that a packet receives at each node. The DSCP may be any value with most values not being standardized. The DS field structure is called a TOS field in the IPv4 header and a Class field in the IPv6 header. Typically, the customer and the ISP negotiate a profile (policing profile) describing the rate at which traffic can be submitted at each service level. Packets in excess of this profile may not be allotted the service level requested. A salient feature of differentiated services is scalability allowing deployment in very large networks. The scalability is achieved by forcing as much complexity out of the core of the network into the boundary devices which processes lower volumes of traffic and lesser numbers of flows, and offering services for aggregate traffic rather than on a per-micro-flow basis. The differentiated services architecture may be utilized in a communication system such as the prior art of FIG. 1.

Certain deficiencies exist with the current differentiated services architecture. Slow access links (wireless or telephone modem) present the sender-oriented differential services architecture with serious drawbacks as a consequence of only the source, such as the source nodes 12 of the prior art diagram of FIG. 1, being in control of the per hop behavior of the packet data transmissions which are received by the destination nodes 14 as the result of only the source nodes typically specifying the value of the aforementioned DSCP field.

The prevalence of low bandwidth access links, such as links 22 and 26 in the prior art of FIG. 1, is a network limitation which will not disappear in the near future. Continued usage of dial up modems with plain old telephone service and a large growth in the number of wireless mobile phones acting as IP hosts will increase the number of low bandwidth access links.

Different types of problems result from low bandwidth access links which severely interfere with the destination nodes 14 of FIG. 1 properly receiving data under the differentiated services architecture as a consequence of the PHB being solely dictated by the source nodes 12 or the upstream network. Source node control in an organization's access link can create problems between a company LAN and an ISP. A company may have a 64K bit/s incoming link from an ISP. When a company worker is connected to the world wide web and connects to an advertisement video, the high quality of service specified by the video at source node 12 will consume over 100K bit/s as a consequence of the DSCP value being marked with the highest value. As a result, a single advertisement video utilizes the whole access link capacity preventing all other activity with the link. Another example is when the user of a destination node is having a IP-telephone conversation. If the person receiving the IP call asks the user to look at a web page, the user's request for the web page consumes the available bandwidth as a result of it originating from a commercial web server, providing prompt responses in which all traffic is sent with the highest DSCP value. As a result, the IP-phone conversation can be severely degraded by the connectivity of the web page to the user. An additional example is when a multicast video is sent to a group of receivers in which the video is marked with a DSCP value representing a high priority. Receipt of this video will totally consume limited bandwidth links, such as links 22 and 26 in FIG. 1, connecting routers to destination nodes.

The current differentiated services architecture focus is totally on the network with the sender controlling the per hop processing by setting the DSCP values. Typically the DSCP value is the result of service level agreements between the senders and ISPs with the destination node having no input into how data packet transmissions transmitted from the various source nodes 12 are transmitted thereto.

Other prior art solutions involve the destination nodes 14 providing a static reception priority to certain types of data. For example, a destination node may always consider data packet transmissions from certain sources, such as a "a company .com" as being the highest priority packets thereby providing a mechanism for the destination node to handle certain types of packets with preferential treatment. However, this does not permit the destination nodes 14 to control the per hop processing of data being transmitted over the communication links to the destination nodes.

Additionally, a modification of the differentiated services architecture has been proposed in which the destination nodes 14 will transmit back to the network a "yes" response to a router or other node that the destination node is to receive the data packet transmissions from the source nodes 12 with the DSCP value specified in the received data packets. If the specified DSCP value indicates a per hop processing which would cause an overload of the capacity of the communication links 22 and 26, the communication system, such as the router 20, is not informed with a transmission by the destination node 14 that the specified DSCP value contained in the packet data transmissions is not accepted. This results in a default per hop processing of data transmission from the router or other node to the destination node 14 which avoids overloading or degrading the communication quality. This proposal however does not allow the destination node 14 to effectively control the per hop processing of the received data packet transmissions with a DSCP value identifying a plurality of possible per hop processing options or any other type of per hop processing. Only the specified per hop processing contained in the data packets which are received by the router or other node or the default per hop processing are possible. Therefore, the destination nodes 14 have no ability to program the per hop processing of data packet transmissions at network nodes received from the source nodes 12.

The resource reservation protocol (RSVP) is a two-way end to end signalling protocol which must be supported in every router in the transmission path of a packet data transmission. In a communication system such as FIG. 1, connectivity between the source nodes 12 and the destination nodes 14 with the RSVP protocol provides a two-way dedicated path with a level of service specified by the destination nodes 14. The RSVP protocol is not dynamic in nature. Once the communication path has been fixed and the quality of service required by the destination node has been specified, the link remains invariable permitting data packet transmissions up to the level of the specified quality of service.

SUMMARY OF THE INVENTION

The present invention is a method of data transmission and a communication system in which the destination nodes in a communication system, such as, but not limited to, the differentiated services architecture, are provided with control of the per hop processing of the received packet data transmissions. Each destination node is given total control over the received packet data transmission transmitted through at least one controlling node (per hop processing which may be qualitative, quantitative, or otherwise). Destination node control permits management of the data flow thereto from any type of controlling node, such as routers and/or switches in a wireline embodiment or from a base station and/or routers and switches in a wireless embodiment. This permits the reception of data packet transmissions from multiple source nodes without overloading or otherwise compromising the functionality of the communication links and/or destination nodes.

The per hop processing is controlled or identified by a command transmitted from the destination node to the controlling node and is diverse in nature. In a preferred embodiment, the per hop processing is fully programmable and specifies DSCP values which are an indication of processing which the at least one controlling node performs in the differentiated services architecture. However, more generally the per hop processing which is controlled or identified by the command may be to control a QOS, priority of processing, qualitative or quantitative processing, or any other data processing.

The present invention is applicable to both unicast and multicast applications. In both applications, each destination node signals a desired per hop processing (e.g., DSCP value) in the form of a command which is transmitted back to the at least one controlling node, such as a base station in a wireless application and a router if connectivity is provided by a wireless communication link.

The present invention in a multilayer application, such as multilayer video, permits different layers to be marked with different quality of service specifications depending upon the characteristics of the destination nodes.

With the invention, each destination node generates a command controlling the reception of packet data transmissions transmitted thereto through at least controlling node with a specified per hop behavior processing to be performed on the at least packet data transmission received by the at least one controlling node. This command may be sent to one or more routers, switches or a base station. Typically the last router or switch (or base station in a wireless embodiment) is sent the command. However, the command may be sent to other routers or switches in order to alleviate any bottleneck in data transmission which is not present at the last router.

The at least one controlling node (router, switch or base station or plurality of routers, switches or base stations) which receives the command preferably authenticates the destination node transmitting the command prior to providing honoring the per hop processing specified in the command. The command may be relayed through all of the controlling nodes in the communication path all the way back to the source node. Alternatively, the transmission of the command may be sent to a controlling node, such as a router or switch, which is not directly connected to (upstream of the controlling node providing direct connectivity) the destination node but, in this circumstance, authentication must be performed carefully. Authentication may be performed either by the at least one controlling node (e.g., the router, switch, base station or some other device associated with these devices) prior to the at least one controlling node being programmed to provide the per hop behavior specified in the command.

The methodology by which routers and base stations control the quality of service to destination nodes is well known and is not part of the present invention.

A method of data transmission in a communication system comprising a source node which originates packet data transmissions, at least one controlling node and a destination node which receives the packet data transmissions in accordance with the invention includes originating at least one packet data transmission at the source node; transmitting the originated packet data transmission to the at least one controlling node, the at least one packet data transmission received at the at least one controlling node from the source node containing information indicating a per hop behavior processing which the at least one controlling node is to perform on the received at least one packet data transmission; the at least one controlling node transmitting the at least one packet data transmission to the destination node with the at least one packet data transmission being received by the destination node with a per hop behavior processing having been performed on the at least one packet data transmission by the at least one controlling node different than the per hop behavior specified in the at least one packet data transmission received by the at least one controlling node; and transmitting from the destination node to the at least one controlling node a command which specifies processing of the at least one packet data transmission by the at least one controlling node receiving the command with a per hop behavior indicated in the command. The at least one controlling node may be a router, switch or a base station. The per hop behavior indicated by the command may be qualitative and specify a degree of time latency during which the at least one packet data transmission must be received by the destination node or specify an acceptable level of loss of data within the at least one packet data transmission. The per hop behavior specified by the command may be quantitative and specify a time interval of time latency with which the at least one packet data transmission must be received by the destination node or specify a maximum level of loss of data with which the at least one packet data transmission must be received by the destination node or a maximum level of loss of data with which the at least one packet data transmission must be received by the destination node.

The communication system may comprise another source node; and the destination node generates the command in response to transmission of at least one packet data transmission from the another source node to the at least one controlling node receiving the command to the destination node.

The communication system may comprise a communication link between the at least one controlling node receiving the command having a data transmission capacity; and the destination node generates the command in response to the destination node choosing to receive data packet transmissions from both source nodes so as to accommodate reception of data packet transmissions from the source nodes within the data transmission capacity.

The per hop behavior indicated in the at least one packet data transmission may be QOS specification specifying processing to be performed by the at least one controlling ode on the received at least one packet data transmission; and the per hop behavior indicated in the command may be a QOS specification processing which is performed by the at least one controlling node on the received at least one packet data transmission.

The per hop behavior specified in the command may be an allocation of bandwidth of the packet data transmission to the destination node or the per hop behavior indicated in the at least one packet data transmission received by the at least one controlling node may be a DSCP and the per hop behavior indicated in the command may be a DSCP which is performed by the at least one controlling node on the received at least one packet data transmission.

The communication system may comprise a plurality of destination nodes; the source node originates at least one packet data transmission to the plurality of destination nodes; and each destination node independently transmits to the at least controlling node a command which specifies processing of the at least one packet data transmission by the at least one controlling node receiving the command with a per hop behavior indicated in the command.

A communication system in accordance with the invention may be a source node which originates packet data transmissions; at least a controlling node, which is responsive to information contained within the at least one packet data transmission indicating a per hop behavior processing which the at least one controlling node is to perform on the at least one packet data transmission; and a destination node, coupled to the at least one controlling node, which receives packet data transmissions transmitted by the at least one controlling node which has been processed by the at least one controlling node with a per hop behavior processing different than the per hop behavior processing indicated in the at least one packet data transmission received by the at least one controlling node and which generates a command which is transmitted to the at least one controlling node which specifies processing of the at least one packet data transmission by the at least one controlling node of the at least one packet data transmission received by the destination node with a per hop indicated in the command. The at least one controlling node may be a router, switch or a base station.

The communication system further may comprise another source node; and the destination node generates the command in response to transmission of at least one packet data transmission from the another source node to the at least one controlling node receiving the command to the destination node.

The communication system may further comprise a communication link, having a data transmission capacity, disposed between the at least one controlling node receiving the command and the destination node; and the destination node generates the command in response to the destination node choosing to receive data packet transmissions from both source nodes so as to accommodate reception of data packet transmissions from the source nodes within the data transmission capacity.

The communication system may comprise a plurality of destination nodes; the source node originates packet data transmissions for transmission to the plurality of destination nodes and each destination node independently transmits to the at least one controlling node a command which controls processing of the data packet transmissions by the at least one controlling node receiving the command with a per hop behavior specified in the command.

The per hop behavior indicated in the at least one packet data transmission may be a DSCP; and the per hop behavior indicated in the command may be a DSCP to be performed by the at least one controlling node, or the per hop behavior indicated in the at least one packet data transmission may be a QOS specification specifying processing to be performed by the at least one controlling node on the received at least one packet data transmission; and the per hop behavior indicated in the command may be a QOS specification processing which is performed by the at least one controlling node on the received at least one packet data transmission, or the per hop behavior indicated in the command is an allocation of bandwidth of the at least one packet data transmission to the destination node.

BRIEF DESCRIPTION OF THE DRAWINGS

Like numbers identify like parts throughout the drawings.

DETAILED DESCRIPTION OF THE INVENTION

Figure 1:
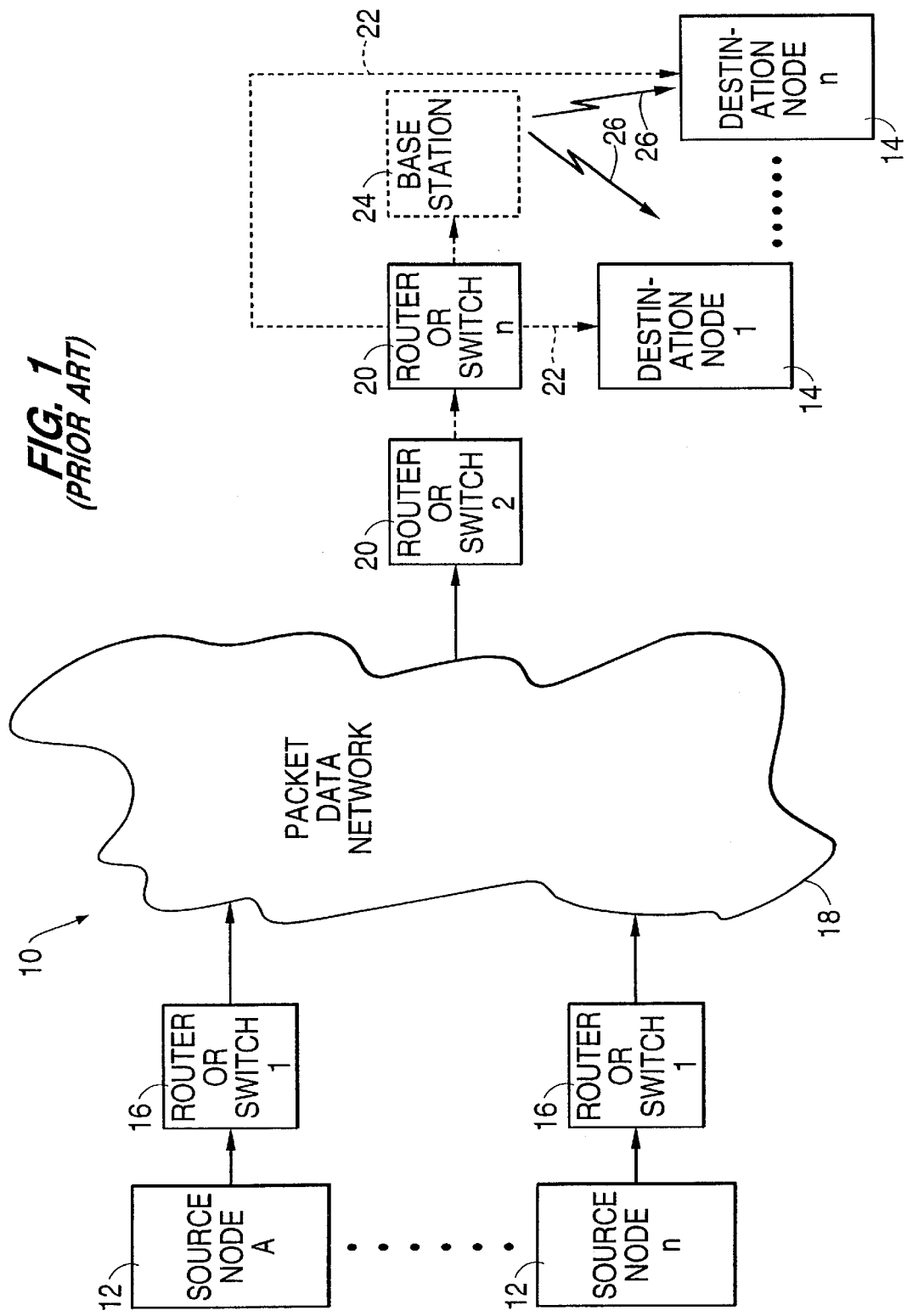
FIG. 1 illustrates a block diagram of a prior art packet data communication system.
Figure 2:
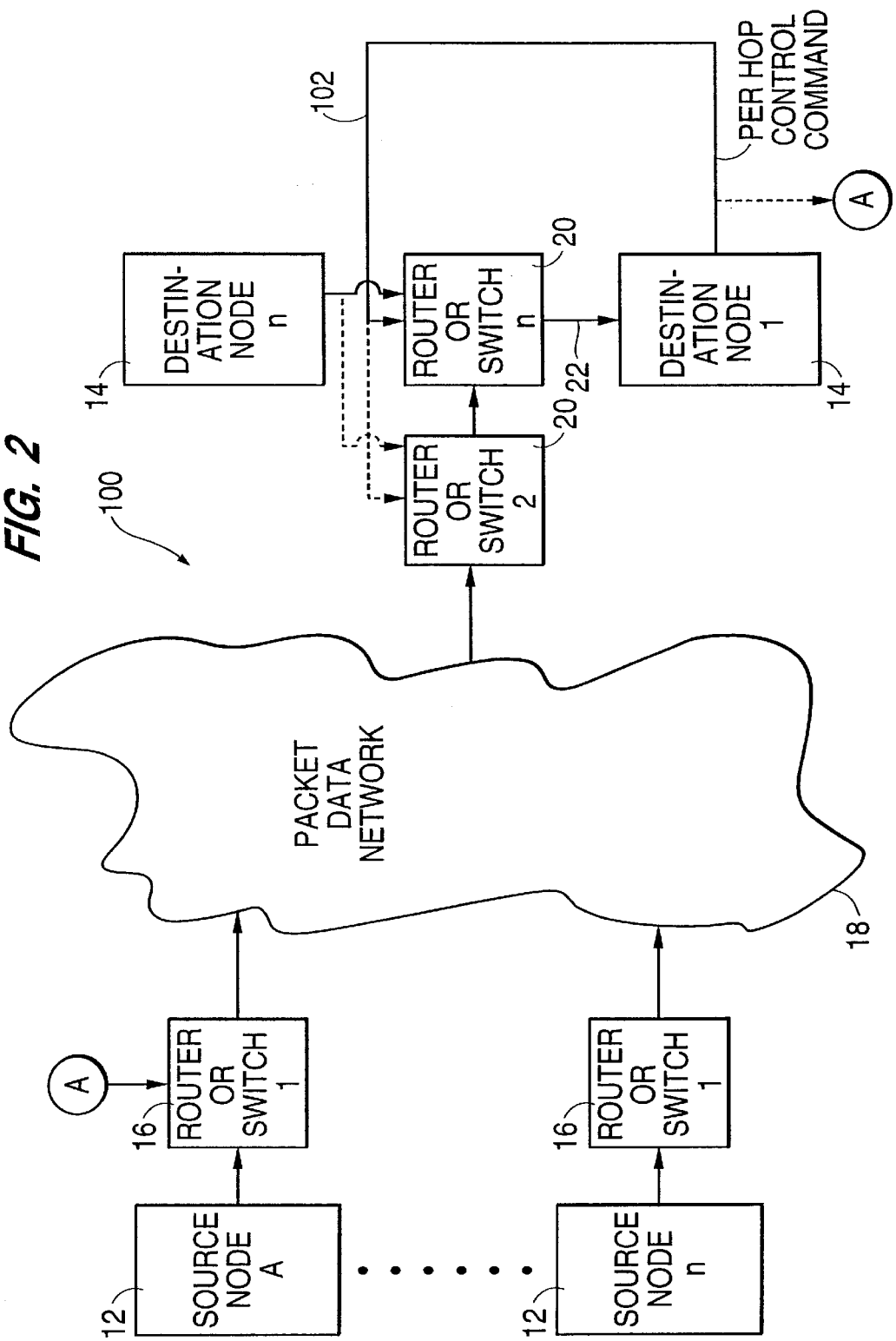
FIG. 2 illustrates a block diagram of a first embodiment of the present invention.

FIG. 2 illustrates a first embodiment 100 in accordance with the present invention. The embodiment 100 of FIG. 2 differs from the prior art of FIG. 1 in that the per hop behavior processing performed by at least one controlling node to process at least one packet data transmission received by each destination node 14 is specified by a per hop control command 102 which is transmitted to the one or more controlling nodes, such as the routers or switches 16 and 20.

A controlling node is any node within the embodiment 100, including nodes (not illustrated) within the IP network 18, which process packet data transmissions passing through the controlling node which have a destination address which is at least one of the destination nodes 14. The per hop control command 102 has diverse applications which include PHB processing by the at least one controlling node to provide a DSCP value in a differentiated services architecture in which the destination nodes control data reception in a fully programmable manner, quality of service processing, prioritization of reception of data, etc. For example, without limitation qualitative and quantative processing options exist for controlling the per hop processing, such as choosing the type of service, good, best, etc., time latency of data transmission, acceptable level of data loss, allocation of bandwidth to packet data transmissions passing through the at least one controlling node from different source nodes, etc. The dotted lines of the command indicate additional possible routers or switches 16 and 20 to which the per hop control command may be addressed. While typically the last router or switch 20 is the one to which the command is addressed in this embodiment, it should be understood that the invention may be practiced with the per hop control command addressed to one or more of any router or switch 16 or 20. The per hop control command 102, which is described in more detail in FIGS. 5 and 6, specifies a particular per hop processing, e.g., a DSCP value of the differentiated services architecture, which each destination node 14 desires for receipt of data packet transmissions from the last router or switch 20 over the communication link 22 from one or more of the source nodes 12. As a result, each destination node 14 is no longer without a mechanism to control the data reception from packet data transmissions originating from one or more source nodes 12. For example, in a circumstance when multiple source nodes 12 (A and N in this example) originate, packet data transmissions which are addressed to destination node (1), the per hop control command provides destination node (1) an effective control mechanism to manage the per hop processing of data received from the at least one controlling node over the communication link 22 so as to avoid the undesirable deficiencies of the prior art described above. As a result, the destination nodes 14 transmit a programmable per hop processing to the at least one controlling node.

In a typical situation, when one of the destination nodes 14 is receiving data packet transmissions from source node A and then receives an indication that packet data transmissions are to be received from another source node, such as source node N, the destination node 14 issues a per hop control command 102 to one or more routers or switches 16 and 20 controlling the per hop processing of the packet data transmissions passing through at least the last router. Typically, the communication link 22 is a low bandwidth link but the invention is not limited to any particular form of wireline link with any data transmission capacity being possible.

The per hop control command 102 permits each destination node 14 to choose reception of packet data transmissions from multiple source nodes 12 under diverse and totally programmable per hop processing performed by at least one controlling node which eliminates the problems of the prior art under the differentiated services architecture.

Figure 3:
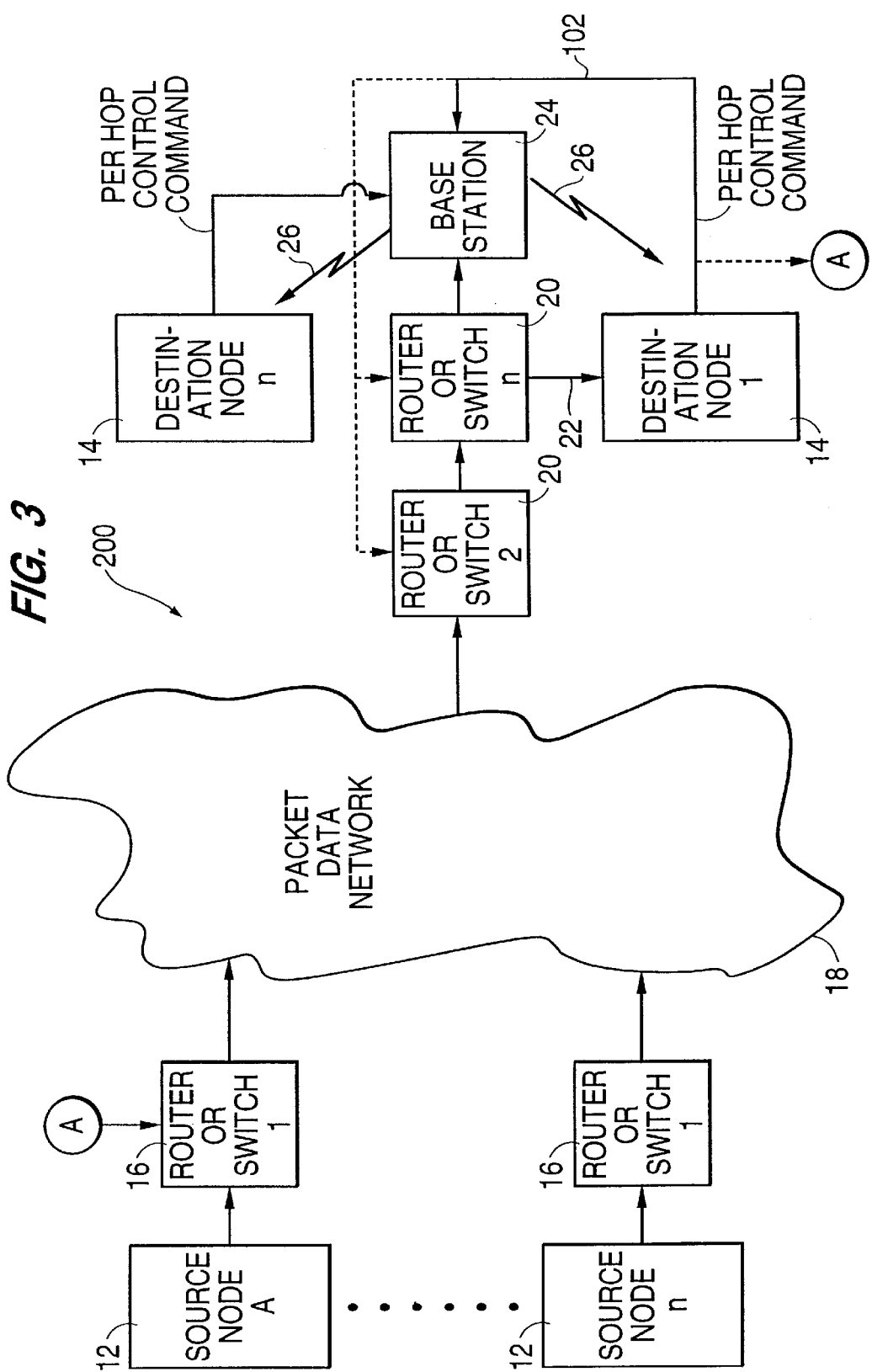
FIG. 3 illustrates a block diagram of a second embodiment of the present invention.

FIG. 3 illustrates a second embodiment 200 of the present invention. The second embodiment 200 differs from the first embodiment 100 only in that connectivity to the destination nodes 14 is provided by wireless link 26 from base station 24. In this embodiment, the command, which performs the same function as the embodiment of FIG. 2, is issued to the base station 24 to cause the base station to perform the same per hop processing that the command performs with the routers or switches 16 and 20 of the embodiment of FIG. 2. Again, the per hop control command provides each destination node 14 with the ability to program the per hop processing of the packet data transmissions in at least one controlling node delivered from the various source nodes 12 via wireless link 26. The dotted lines of the per hop control command 102 indicate alternative routers or switches 16 and 20 to which the quality of service command may be addressed. While typically the base station 24 is the recipient of the per hop control command, in this embodiment it should be understood that the invention may be practiced with the per hop control command addressed to one or more of base station 24 or routers or switches 16 or 20.

Figure 4:
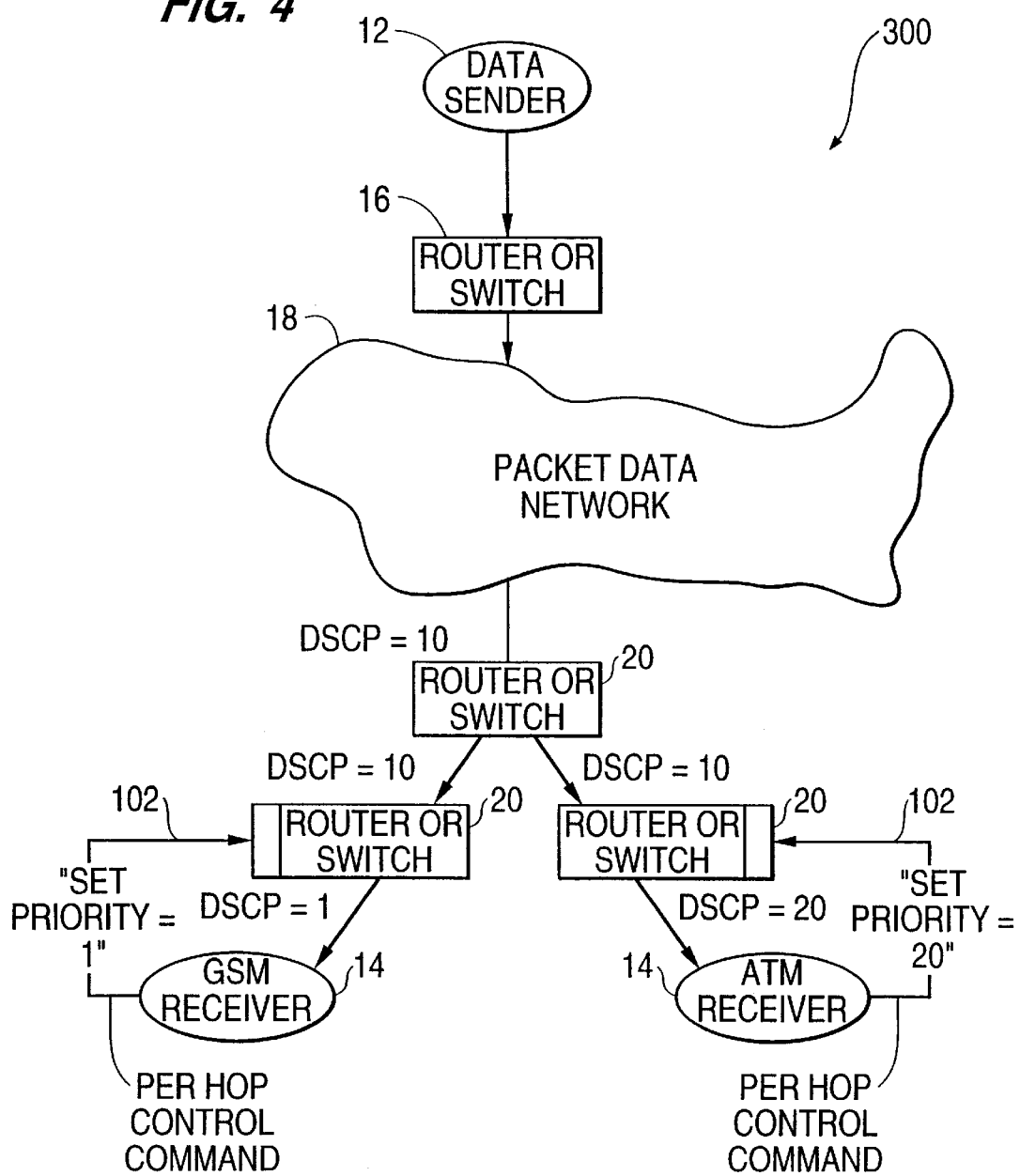
FIG. 4 illustrates a block diagram of a third embodiment of the present invention.

FIG. 4 illustrates a third embodiment 300 of the invention in which a multicast transmission is sent from a data sender to multiple receiving devices. The function of the per hop control command 102 in this embodiment is similar to the embodiments 100 and 200. The data sender (source node) 12 originates the multicast packet data transmission with a DSCP value of 10. The first router or switch 20 to which the output of the packet data network is connected splits the multicast packet data transmission for delivery through a pair of routers or switches 20 respectively to a GSM receiver 14 and an ATM receiver 14. A base station is not illustrated in this example. The relative DSCP value of the per hop control command 102 from the GSM receiver 14 is "1" to router or switch 20 and the relative DSCP value of the command from the ATM receiver 14 to router or switch 20 is "20". The effect of the per hop control command 102 from the GSM receiver 14 is to lower the per hop processing of the packet data transmission from the data sender 12 from "10" to "1" to meet reception requirements of the GSM receiver 14. The effect of the command 102 from the ATM receiver 14 is to insure that a relatively high level of reception is maintained, which happens to be higher than the priority of the packet data transmission from the data sender 12, which results in no diminishing in the quality of receipt of the packet data transmissions. As is seen from this example, each receiver 14 receives a multicast packet data transmission from a single data sender 12 with a fixed priority and has independent control of the quality of the received packet data transmissions which, in this case, are controlled by a relative priority with higher priority values indicating a higher priority for the delivery of a packet data transmission to the destination node.

Figure 5:
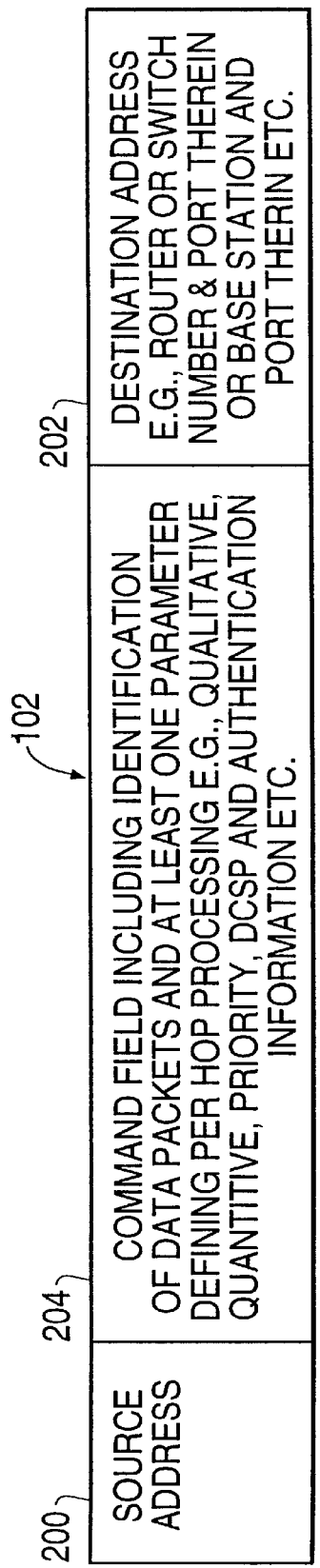
FIG. 5 illustrates a possible format of the per hop control command.

FIG. 5 illustrates one possible implementation of the per hop control command 102. The per hop control command contains a source address 200 which specifies the address of the destination node 14, which may include a port number, from which the command 102 is outputted and a destination address 202 which specifies that the command is sent to either a base station 24 or one or more of the routers or switches 16 and 20 including any receiving port therein. Additionally, the per hop control command 102 contains a data field 204 which has diverse applications in defining the type of per hop behavior processing to be performed by the at least one controlling node on the at least one packet data transmission transmitted from the at least one controlling node to the at least one destination node. The data field 204 includes the necessary identification of the packet data transmission(s) on which the per hop behavior processing will be performed, as distinguished from all other packet data transmissions which are processed in the addressed controlling node, and one or more parameters without limitation which define the nature of the per hop processing, such as qualitative, quantative, priority, DSCP, etc. and authentication information.

The methodology by which authentication is performed may be diverse and different implementations may be utilized with the practice of the invention. It should be understood that the present invention is not limited to any particular type or format of per hop control command 102.

Figure 6:
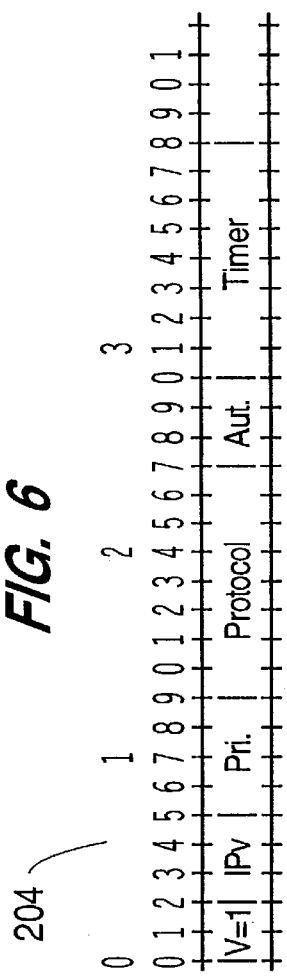
FIG. 6 illustrates an example of the data field of the per hop control command.

FIG. 6 illustrates one example of the data field 204 but it should be understood that the invention is not limited thereto with the parts of the data field being defined as follows:

V: Version number

IPv: IPv4 or IPv6

Pri: Priority (this is relative priority from the end-users point of view) 15 is highest priority.

Protocol: Protocol number of the reserved flow (usually UDP).

Aut: Whether authentication is in use and separate authentication header is place.
 For example, 0 means no authentication, 1 means Visa, 2 means RSVP identity format, etc.

Timer: This contains the value in seconds for the ACK refresh period. If router does not get ACK for some flow in (timer*3) seconds, then DS-enabling state is released. Maximum refreshment interval is 1024 seconds (about 17 minutes). If timer=0, then refreshments are not used at all.

In addition to this fixed format, there are also variable length headers for IPv4 and for IPv6 flows (because their addresses have different lengths). An additional authentication header (including true identity, etc.) is also possible.

In the embodiments of the invention 100–300, it should be understood that the destination nodes 14 may be diverse in nature and represent any type of receiving device.

While the invention has been described in terms of its preferred embodiments, it should be understood that numerous modifications may be made thereto without departing from the spirit and scope of the invention as defined in the appended claims. It is intended that all such modifications fall within the scope of the appended claims.

What is claimed is:

1. A method of data transmission in a communication system comprising a source node which originates packet data transmissions, at least one controlling node and a destination node which receives the packet data transmissions comprising:

originating at least one packet data transmission at the source node;

transmitting the originated packet data transmission to the at least one controlling node, the at least one packet data transmission received at the at least one controlling node from the source node containing information indicating a per hop behavior processing which the at least one controlling node is to perform on the received at least one packet data transmission;

the at least one controlling node transmitting the at least one packet data transmission to the destination node with the at least one packet data transmission being received by the destination node with a per hop behavior processing having been performed on the at least one packet data transmission by the at least one controlling node different than the per hop behavior processing specified in the at least one packet data transmission received by the at least one controlling node; and transmitting from the destination node to the at least one controlling node a command which specifies processing of the at least one packet data transmission by the at least one controlling node receiving the command with a per hop behavior indicated in the command.

2. A method in accordance with claim 1 wherein:

the at least one controlling node is a router.

3. A method in accordance with claim 1 wherein:

the at least one controlling node is a base station.

4. A method in accordance with claim 1 wherein;

the at least one controlling node is a switch.

5. A method in accordance with claim 1 wherein:

the per hop behavior indicated by the command is qualitative.

6. A method in accordance with claim 5 wherein:

the per hop behavior indicated by the command specifies a degree of time latency during which the at least one packet data transmission is received by the destination node.

7. A method in accordance with claim 5 wherein:

the per hop behavior indicated by the command specifies an acceptable level of loss of data within the at least one packet data transmission.

8. A method in accordance with claim 2 wherein:

the per hop behavior indicated by the command is qualitative.

9. A method in accordance with claim 8 wherein:

the per hop behavior indicated by the command specifies a degree of time latency during which the at least one packet data transmission is received by the destination node.

10. A method in accordance with claim 8 wherein:

the per hop behavior indicated by the command specifies an acceptable level of loss of data within the at least one packet data transmission.

11. A method in accordance with claim 3 wherein:

the per hop behavior indicated by the command is qualitative.

12. A method in accordance with claim 11 wherein:

the per hop behavior indicated by the command specifies a degree of time latency during which the at least one packet data transmission is received by the destination node.

13. A method in accordance with claim 11 wherein:

the per hop behavior indicated by the command specifies an acceptable level of loss of data within the at least one packet data transmission.

14. A method in accordance with claim 4 wherein:

the per hop behavior indicated by the command is qualitative.

15. A method in accordance with claim 14 wherein:

the per hop behavior indicated by the command specifies a degree of time latency during which the at least one packet data transmission is received by the destination node.

16. A method in accordance with claim 14 wherein:

the per hop behavior indicated by the command specifies an acceptable level of loss of data within the at least one packet data transmission.

17. A method in accordance with claim 1 wherein:

the per hop behavior indicated by the command is quantitative.

18. A method in accordance with claim 17 wherein:

the quantitative per hop behavior indicated by the command specifies a time interval of time latency with which the at least one packet data transmission must be received by the destination node.

19. A method in accordance with claim 1 wherein:

the quantitative per hop behavior indicated by the command specifies a maximum level of loss of data with which the at least one packet data transmission must be received by the destination node.

20. A method in accordance with claim 2 wherein:

the per hop behavior indicated by the command is quantitative.

21. A method in accordance with claim 20 wherein:

the quantitative per hop behavior indicated by the command specifies a time interval of time latency with which the at least one packet data transmission must be received by the destination node.

22. A method in accordance with claim 20 wherein:

the quantitative per hop behavior indicated by the command specifies a maximum level of loss of data with which the at least one packet data transmission must be received by the destination node.

23. A method in accordance with claim 3 wherein:

the per hop behavior indicated by the command is quantitative.

24. A method in accordance with claim 23 wherein:

the quantitative per hop behavior indicated by the command specifies a time interval of time latency with which the at least one packet data transmission must be received by the destination node.

25. A method in accordance with claim 23 wherein:

the quantitative per hop behavior indicated by the command specifies a maximum level of loss of data with which the at least one packet data transmission must be received by the destination node.

26. A method in accordance with claim 4 wherein:

the per hop behavior indicated by the command is quantitative.

27. A method in accordance with claim 26 wherein:

the quantitative per hop behavior indicated by the command specifies a time interval of time latency with which the at least one packet data transmission must be received by the destination node.

28. A method in accordance with claim 26 wherein:

the quantitative per hop behavior indicated by the command specifies a maximum level of loss of data with which the at least one packet data transmission must be received by the destination node.

29. A method in accordance with claim 1 wherein:

the communication system further comprises another source node; and the destination node generates the command in response to transmission of at least one packet data transmission from the another source node to the at least one controlling node receiving the command to the destination node.

30. A method in accordance with claim 29 wherein:

the communication system further comprises a communication link having a data transmission capacity and which is disposed between the at least one controlling node receiving the command and the destination node; and the destination node generates the command in response to the destination node choosing to receive data packet transmissions from both source nodes so as to accommodate reception of data packet transmissions from the source nodes within the data transmission capacity.

31. A method in accordance with claim 1 wherein:

the per hop behavior indicated in the at least one packet data transmission received by the at least one controlling node is a differentiated services code point and the per hop behavior indicated in the command is a differentiated services code point which is performed by the at least one controlling node on the received at least one packet data transmission.

32. A method in accordance with claim 2 wherein:

the per hop behavior indicated in the at least one packet data transmission received by the at least one controlling node is a differentiated services code point; and the per hop behavior indicated in the command is a differentiated services code point which is performed by the at least one controlling node on the received at least one packet data transmission.

33. A method in accordance with claim 3 wherein:

the per hop behavior indicated in the at least one packet data transmission received by the at least one controlling node is a differentiated services code point; and the per hop behavior indicated in the command is a differentiated services code point which is performed by the at least one controlling node on the received at least one packet data transmission.

34. A method in accordance with claim 4 wherein:
the per hop behavior indicated in the at least one packet data transmission received by the at least one controlling node is a differentiated services code point; and
the per hop behavior indicated in the command is a differentiated services code point which is performed by the at least one controlling node on the received at least one packet data transmission.

35. A method in accordance with claim 5 wherein:
the per hop behavior indicated in the at least one packet data transmission received by the at least one controlling node is a differentiated services code point; and
the per hop behavior indicated in the command is a differentiated services code point which is performed by the at least one controlling node on the received at least one packet data transmission.

36. A method in accordance with claim 14 wherein:
the per hop behavior indicated in the at least one packet data transmission received by the at least one controlling node is a differentiated services code point; and
the per hop behavior indicated in the command is a differentiated services code point which is performed by the at least one controlling node on the received at least one packet data transmission.

37. A method in accordance with claim 29 wherein:
the per hop behavior indicated in the at least one packet data transmission received by the at least one controlling node is a differentiated services code point; and
the per hop behavior indicated in the command is a differentiated services code point which is performed by the at least one controlling node on the received at least one packet data transmission.

38. A method in accordance with claim 30 wherein:
the per hop behavior indicated in the at least one packet data transmission received by the at least one controlling node is a differentiated services code point; and
the per hop behavior indicated in the command is a differentiated services code point which is performed by the at least one controlling node on the received at least one packet data transmission.

39. A method in accordance with claim 1 wherein:
the per hop behavior indicated in the command is an allocation of bandwidth of the at least one packet data transmission to the destination node.

40. A method in accordance with claim 1 wherein:
the communication system comprises a plurality of destination nodes;
the source node originates at least one packet data transmission to the plurality of destination nodes; and
each destination node independently transmits to the at least controlling node a command which specifies processing of the at least one packet data transmission by the at least one controlling node receiving the command with a per hop behavior indicated in the command.

41. A method in accordance with claim 40 wherein:
the per hop behavior indicated in the at least one packet data transmission received by the at least one controlling node is a differentiated services code point; and
the per hop behavior indicated in the command is a differentiated services code point which is performed by the at least one controlling node on the received at least one packet data transmission.

42. A method in accordance with claim 1 wherein:
the per hop behavior indicated in the at least one packet data transmission is a quality of service specification specifying processing to be performed by the at least one controlling node on the received at least one packet data transmission; and
the per hop behavior indicated in the command is a quality of service specification processing which is performed by the at least one controlling node on the received at least one packet data transmission.

43. A method in accordance with claim 2 wherein:
the per hop behavior indicated in the at least one packet data transmission is a quality of service specification specifying processing to be performed by the at least one controlling node on the received at least one packet data transmission; and
the per hop behavior indicated in the command is a quality of service specification processing which is performed by the at least one controlling node on the received at least one packet data transmission.

44. A method in accordance with claim 3 wherein:
the per hop behavior indicated in the at least one packet data transmission is a quality of service specification specifying processing to be performed by the at least one controlling node on the received at least one packet data transmission; and
the per hop behavior indicated in the command is a quality of service specification processing which is performed by the at least one controlling node on the received at least one packet data transmission.

45. A method in accordance with claim 4 wherein:
the per hop behavior indicated in the at least one packet data transmission is a quality of service specification specifying processing to be performed by the at least one controlling node on the received at least one packet data transmission; and
the per hop behavior indicated in the command is a quality of service specification processing which is performed by the at least one controlling node on the received at least one packet data transmission.

46. A method in accordance with claim 5 wherein:
the per hop behavior indicated in the at least one packet data transmission is a quality of service specification specifying processing to be performed by the at least one controlling node on the received at least one packet data transmission; and
the per hop behavior indicated in the command is a quality of service specification processing which is performed by the at least one controlling node on the received at least one packet data transmission.

47. A method in accordance with claim 14 wherein:
the per hop behavior indicated in the at least one packet data transmission is a quality of service specification specifying processing to be performed by the at least one controlling node on the received at least one packet data transmission; and
the per hop behavior indicated in the command is a quality of service specification processing which is performed by the at least one controlling node on the received at least one packet data transmission.

48. A method in accordance with claim 29 wherein:
the per hop behavior indicated in the at least one packet data transmission is a quality of service specification specifying processing to be performed by the at least one controlling node on the received at least one packet data transmission; and the per hop behavior indicated in the command is a quality of service specification processing which is performed by the at least one controlling node on the received at least one packet data transmission.

49. A method in accordance with claim 23 wherein:

the per hop behavior indicated in the at least one packet data transmission is a quality of service specification specifying processing to be performed by the at least one controlling node on the received at least one packet data transmission; and the per hop behavior indicated in the command is a quality of service specification processing which is performed by the at least one controlling node on the received at least one packet data transmission.

50. A communication system comprising:

a source node which originates packet data transmissions;

at least a controlling node, which is responsive to information contained within the at least one packet data transmission indicating a per hop behavior processing which the at least one controlling node is to perform on the at least one packet data transmission; and a destination node, coupled to the at least one controlling node, which receives packet data transmissions transmitted by the at least one controlling node which has been processed by the at least one controlling node with a per hop behavior processing different than the per hop behavior processing indicated in the at least one packet data transmission received by the at least one controlling node and which generates a command which is transmitted to the at least one controlling node which specifies processing of the at least one packet data transmission by the at least one controlling node of the at least one packet data transmission received by the destination node with a per hop behavior processing indicated in the command.

51. A communication system in accordance with claim 50 wherein:

the at least one controlling node is a router.

52. A communication system in accordance with claim 50 wherein:

the at least one controlling node is a base station.

53. A communication system in accordance with claim 50 wherein:

the at least one controlling node is a switch.

54. A communication system in accordance with claim 50 wherein:

the communication system further comprises another source node; and the destination node generates the command in response to transmission of at least one packet data transmission from the another source node to the at least one controlling node receiving the command to the destination node.

55. A communication system in accordance with claim 54 wherein:

the communication system further comprises a communication link, having a data transmission capacity, disposed between the at least one controlling node receiving the command and the destination node; and the destination node generates the command in response to the destination node choosing to receive data packet transmissions from both source nodes so as to accommodate reception of data packet transmissions from the source nodes within the data transmission capacity.

56. A communication system in accordance with claim 50 wherein:

the communication system comprises a plurality of destination nodes;

the source node originates packet data transmissions for transmission to the plurality of destination nodes; and each destination node independently transmits to the at least one controlling node a command which controls processing of the data packet transmissions by the at least one controlling node receiving the command with a per hop behavior specified in the command.

57. A communication system in accordance with claim 50 wherein:

the per hop behavior indicated in the at least one packet data transmission is a differentiated services code point; and the per hop behavior indicated in the command is a differentiated services code point to be performed by the at least one controlling node.

58. A communication system in accordance with claim 50 wherein:

the per hop behavior indicated in the at least one packet data transmission is a quality of service specification specifying processing to be performed by the at least one controlling node on the received at least one packet data transmission; and the per hop behavior indicated in the command is a quality of service specification processing which is performed by the at least one controlling node on the received at least one packet data transmission.

59. A communication system in accordance with claim 50 wherein:

the per hop behavior indicated in the command is an allocation of bandwidth of the at least one packet data transmission to the destination node.

* * * * *